United States Patent [19]

Klinger

[11] Patent Number: 5,084,954
[45] Date of Patent: Feb. 4, 1992

[54] QUICK CONNECTOR UNIVERSAL RELEASE TOOL

[75] Inventor: Gary Klinger, Allen Park, Mich.

[73] Assignee: ITT Corporation, New York, N.Y.

[21] Appl. No.: 629,933

[22] Filed: Dec. 19, 1990

[51] Int. Cl.⁵ .................................................. F16L 35/00
[52] U.S. Cl. ....................................................... 29/237
[58] Field of Search ..................... 294/99.1, 99.2, 33; 29/272, 237, 235, 268

[56] References Cited

U.S. PATENT DOCUMENTS

| | | | |
|---|---|---|---|
| 266,007 | 10/1882 | Dodger | 294/99.2 |
| 1,170,334 | 1/1916 | Riggs | 29/272 |
| 1,940,910 | 12/1933 | Hickey | 29/272 |
| 3,281,929 | 11/1966 | Shinnich | 29/237 |
| 3,299,496 | 1/1967 | Christensen | 29/237 |
| 3,680,893 | 8/1972 | Giraud . | |
| 3,711,632 | 6/1973 | Ghirardi . | |
| 4,055,359 | 10/1977 | McWethy . | |
| 4,108,474 | 8/1978 | Sigrist . | |
| 4,159,132 | 6/1979 | Hitz . | |
| 4,189,817 | 2/1980 | Moebius . | |
| 4,198,738 | 4/1980 | Wallace | 29/237 |
| 4,257,135 | 3/1981 | Moebius . | |
| 4,483,056 | 11/1984 | Schwaler et al. | 29/237 |
| 4,657,458 | 4/1987 | Woller . | |
| 4,728,076 | 3/1988 | Ganshorn . | |
| 4,749,214 | 6/1988 | Hoskins . | |
| 4,756,558 | 7/1988 | Beamer . | |
| 4,757,588 | 7/1988 | Churchich | 29/268 |
| 4,769,889 | 9/1988 | Landman . | |
| 4,781,400 | 11/1988 | Cunningham . | |
| 4,795,197 | 1/1989 | Kaminski . | |
| 4,842,309 | 6/1989 | LaVene . | |
| 4,846,518 | 7/1989 | Hamel | 294/99.1 |
| 4,927,185 | 5/1990 | McNaughton . | |

Primary Examiner—Robert C. Watson
Attorney, Agent, or Firm—Robert P. Seitter; J. Gordon Lewis

[57] ABSTRACT

A universal quick connector release tool includes a handle and a bifurcated body resiliently mounted to the handle and including one or more finger members extending from each half of the body which collectively form a tapered fitting receiving passageway which is radially resiliently adapted to male tubular fittings of varying diameter and to demate such male fitting conduit with corresponding connectors.

22 Claims, 2 Drawing Sheets

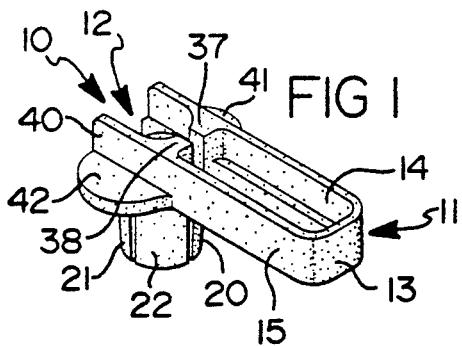
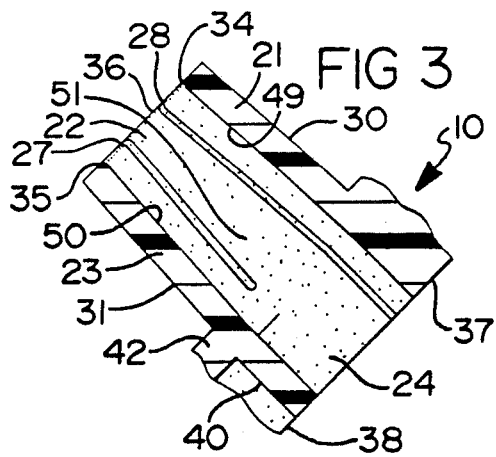
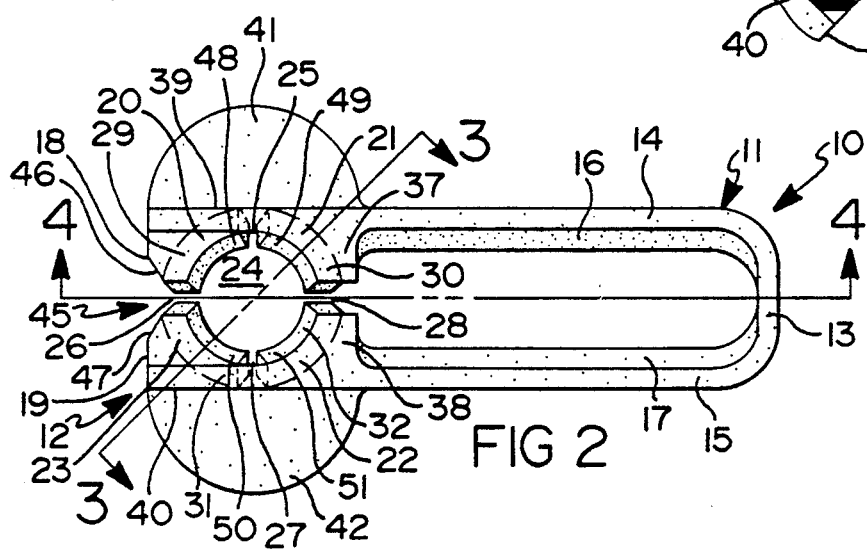
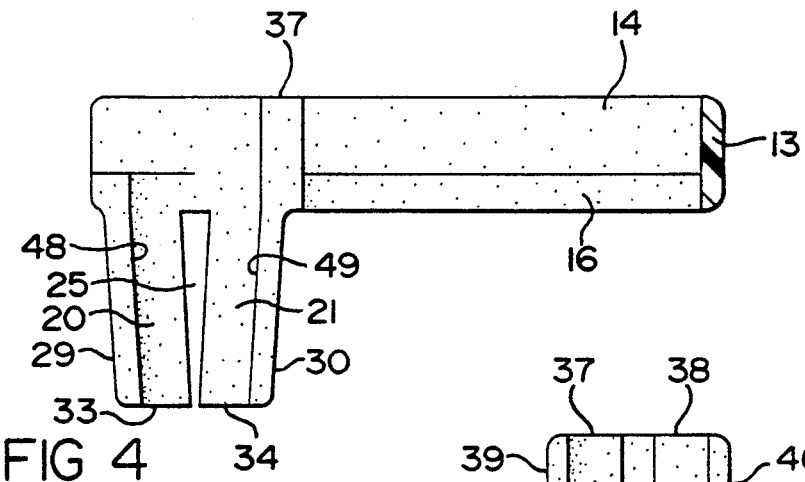
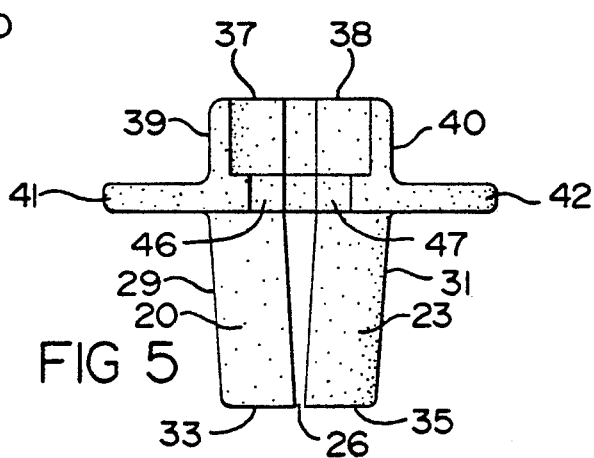

QUICK CONNECTOR UNIVERSAL RELEASE TOOL

INTRODUCTION

The present invention relates to application specific hand tools employed to reconfigure mechanical assemblies and, more particularly, to release tools employed to decouple fittings from mating connectors. More particularly still, the present invention relates to tools adapted for releasing tubular male conduit fittings from mating female connectors.

BACKGROUND OF THE INVENTION

Quick connectors have long been used to facilitate assembly of mechanical devices without the use of special tooling. This is particularly true in complex - systems wherein numerous fluid conduit interconnections are required. In the design of quick connectors used in the industry today, it is sometimes desirable to incorporate an inaccessible retaining mechanism within the fitting. Since the retainer is non-accessible, a tool is needed to open the retainer fingers and thus allow the male fitting to be removed from the female housing.

Although tools adapted for release of quick connector type fittings are known, they suffer from a number of infirmities and no design has yet received wide spread acceptance. Because quick connect fittings are used on a range of standard tube sizes (typically ¼, 5/16" and ⅜" outside diameter), prior approaches have been to provide a separate special tool for each tube size. Additionally, design differences between quick connect fittings of the same size from one manufacturer to another have necessitated different tools or the application of a tool in very precise positional relationship with respect to the fitting to effect the decoupling. This has proven extremely inconvenient and such tools are not widely used.

Secondly, release tools have frequently been difficult to manipulate due to the small size of the fittings and the relatively high pull apart forces involved. Known tools have tended to be fragile and easily broken, even with proper use, thereby further discouraging their acceptance. A related shortcoming of known tools is in their requirement for two hand operation which is particularly difficult in many installations where access is limited.

BRIEF DESCRIPTION OF THE INVENTION

The present invention overcomes many of the above described shortcomings of prior art quick connector release tools by providing a single tool with universal application, fitting the majority of standard tube sizes as well as both metal and plastic type quick connectors of most known configurations. Furthermore, the present invention provides an inexpensive tool of robust design which can easily be held and manipulated by one hand.

According to the present invention, a tool which is adapted for releasing male fittings from mating female connectors coupled together by a retaining element includes an elongated handle and two or more finger members extending from the handle coacting to define a tapered passage which, in application, conforms to a surface of the male fitting to displace the retaining element for release of the fitting from the connector.

In the preferred embodiment of the invention, a bifurcated body is provided which includes first and second complimentary body halves which are resiliently carried by the handle and at least one finger member extends from each body half and coacting with one another to define a radially compliant passage way which, in application, substantially conforms to a surface of the male fitting and displaces the coupling retaining element for release of the fitting from the connector. This arrangement has the advantage of providing simple construction, one hand operation and a tool which reconfigures itself to adapt to varying male fitting dimensions.

According to another aspect of the invention, the handle body, and finger members are integrally formed from a homogeneous material such as plastic. This arrangement has the advantage of providing extremely low cost.

Still another aspect of the present invention, includes a generally U-shaped handle including a base portion and generally parallel resilient arm portions extending therefrom and wherein the complimentary body halves are carried by corresponding free ends of the arm portions. This arrangement has the advantage of simple design and a handle which inherently resiliently positions the body halves with respect to one another and permits their momentary displacement in application as the tool is mounted on the male fitting.

According to yet another aspect of the invention, two or more finger members depend from each body half which collectively substantially circumscribe the outer circumference of the male fitting to ensure contact with the fitting retaining element from any angular position.

According to still another aspect of the present invention, the handle is provided with a through passage for receiving a tether of other suitable member to ensure against loss. This arrangement has the advantage of providing a more robust design to the handle as well as allows the tool to be attached or supported from another device.

These and other features and advantages of this invention will become apparent upon reading the following specification, which, along with the drawings describes and discloses a preferred and alternative embodiment of the invention in detail.

The detailed description of the disclosed embodiments makes reference to the accompanying drawings.

BRIEF DESCRIPTION OF THE DRAWINGS

FIG. 1, is a perspective view of the preferred embodiment of the universal release tool according to the present invention;

FIG. 2, is a top plan view on an enlarged scale of the tool of FIG. 1;

FIG. 3, is a fragmentary cross sectional view taken on lines 3—3 of FIG. 2;

FIG. 4, is a cross sectional view taken on lines 4—4 of FIG. 2;

FIG. 5, is an end plan view of the preferred embodiment according to the present invention;

A DETAILED DESCRIPTION OF PREFERRED AND ALTERNATIVE EMBODIMENTS

Figure 6:
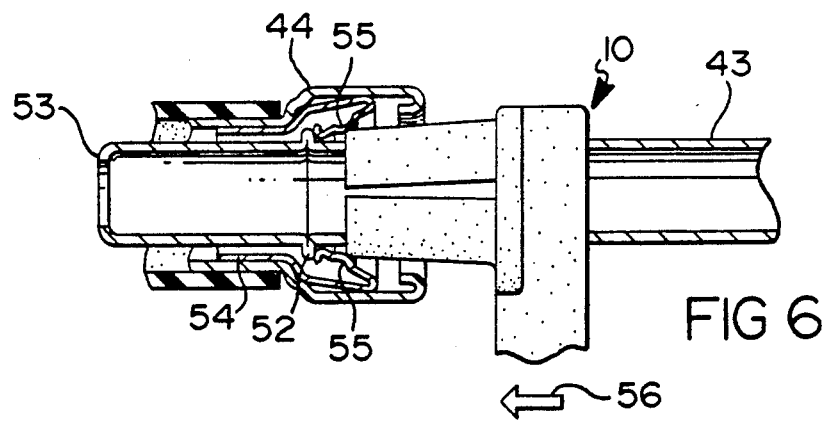
FIG. 6, is a broken, partial sectional view of the present invention with a typical metal bodied quick connector with the male fitting and female connector in the latched condition.

Referring to FIGS. 1-5, a universal quick connector release tool, shown generally at 10, includes an elongated handle portion 11 and a body portion 12. Handle 11 is generally U shaped, including a base 13 and two generally parallel arms 14, 15 extending therefrom. Arms, 14, 15 have reinforcing ribs 16, 17 extending longitudinally there along, merging into base 13. The free ends of arms 14, 15, each support a body half 18, 19 comprising body portion 12.

Each body half 18, 19 supports two generally arcuate finger members 20, 21 and 22, 23. Finger members 20-23 are circumferentially spaced to define a tapered fitting receiving passageway 24 having an axis which is angularly offset from the line of elongation of handle 11 to provide clearance from an associated coupling as will be described in detail hereinbelow. Finger members 20-23 are relatively flexible and thus subject to radial displacement. In this sense, passageway 24 is deemed radially compliant. Although the axial passageway 24 is illustrated as normal to the line of elongation of handle 11, it is contemplated that it could be angularly offset by an acute or obtuse angle as well.

As can be best seen in FIG. 2, each finger member 20-23 is spaced from its two adjoining finger members, each finger member extending arcuately somewhat less that 90 degrees and spaced from the next adjoining finger members by a varying gap 25, 26, 27 and 28.

Each finger member 20-23 is axially coextensive with the others and, in the preferred embodiment of the invention, has a characteristic radius which varies from a smaller value at the end of the finger member furthest from body 12 to a larger value at the end thereof adjacent body 12. Although finger members 20-23 could be formed with a constant radius along their entire length, it is believed that a varying radius provides better over all performance of tool 10 in a range of fitting sizes. It should be apparent to one of ordinary skill in the art in light of the specification that the specific radius range of finger members 20-23 will be dictated by the outer diameter of the fitting dimension in the middle of the predetermined dimensional range of the fittings.

Gaps 26 and 28 are coplanar and effectively bifurcate body 12. As will be described in detail hereinbelow, the radially outermost surface of finger members 20-23 are designated ramp surfaces 29-32, respectively, and the end most surface of finger members 20-23 are designated abutment surfaces 33-36.

As best viewed in FIG. 1, on the free ends of arms 14, 15, respectively, on the side thereof opposite the lateral sides 39, 40 of the free ends of arms 14, 15, respectively, form a pinch point for squeezing the free ends of arms 14, 15 together. Semicircular laterally extending finger tabs 41, 42 depend from the free ends of arms 14, 15, respectively, and serve as a push point for urging tool 10 axially along fitting receiving passage way 24. As best viewed in FIG. 5, so constructed, lateral sides, 39, 40 and finger tabs 41, 42 permit simultaneous squeezing together and axial displacement of the free ends of arms 14, 15 and thus body 12. Tool 10 is construction of injection molded plastic or other suitable material which is rigid enough to perform the intended function as described hereinbelow and, simultaneously, resilient enough to enable body halves 18, 19 to be momentarily separated for mounting tool 10 upon an object fitting.

Figure 7:
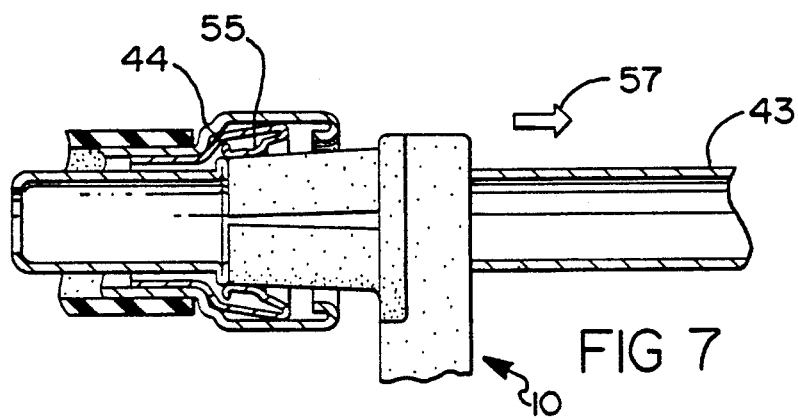
FIG. 7, represents the fitting of FIG. 6, with the tool having displaced the retaining element of the fitting to release the male fitting for removal from the female connector.

Referring to FIGS. 6 and 7, a typical application of tool 10 is illustrated. Beginning with a preassembled coupling comprising a tubular male fitting conduit 43 entrapped within a female connector 44, tool 10 is aligned whereby the line of elongation of handle 11 is generally normal to the axis of conduit 43. Thereafter a v-notch 45 (refer to FIG. 2) within body 12 and defined by chamfers 46, 47 in body halves 18, 19 respectively, is pressed against conduit 43 to momentarily spread the free ends of arms 14, 15 and enable positioning of passage way 24 concentrically with conduit 43 wherein the resilient nature of the material forming arms 14, 15, will cause them to snap back or reassume their illustrated generally parallel orientation. At this point, the radially intermost surfaces 48-51 (refer to FIG. 2) of finger members 20-23, respectively closely abut and substantially circumscribe conduit 43. The illustrated male fitting conduit 43 has a radially extended peripheral abutment 52 positioned a desired distance from the end 53 of the male fitting conduit 43. The male fitting conduit 43 is retained and locked within the female fitting connector 44 by a retaining member 54 and abutment 52. Retaining member 54 has a plurality of fingers or tangs 55 which encircle the abutment 52 to securely retain the male fitting conduit 43 in the female fitting connector 44.

Once positioned as illustrated in FIG. 6, tool 10 is displaced leftwardly as indicated by arrow 56 until abutment surfaces 33-36 contact peripheral abutment 52 of conduit 43. In so doing, ramp surfaces 29-32 momentarily radially displace tangs 55 sufficiently to enable axial removal of conduit 43 as indicated by arrow 57 in FIG. 7.

Figure 8:
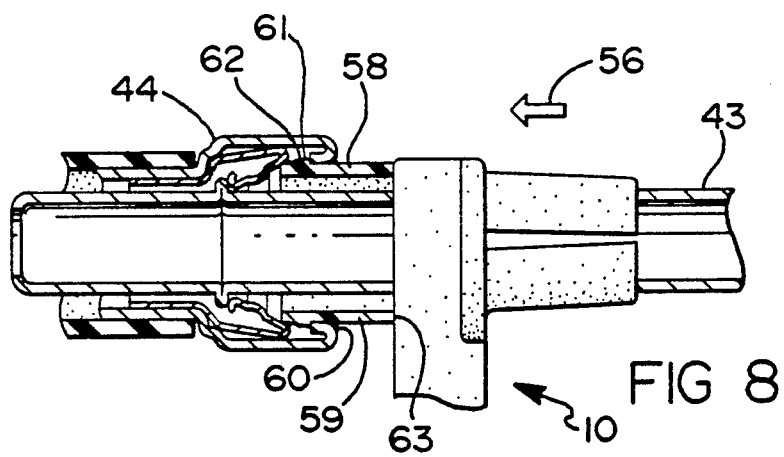
FIG. 8, represents an alternative coupling design including a dedicated release collar carried by the female connector.

Referring to FIG. 8, an alternative application with conduit 43 and female connector 44 as described with respect to drawing FIGS. 6 and 7 with the sole modification that connector 44 carries an integral release collar 58. Collar 58 includes a general tubular body portion 59, open at both ends, and having one end thereof extending axially externally of female connector 44 concentric to conduit 43. The outer diameter of body portion 59 is slightly smaller than a conduit receiving opening 60 defined by female connector 44. Body portion 59 has an inner diameter slightly larger than the maximum outer diameter of peripheral abutment 52 of conduit 43. The intermost portion of body portion 59 includes one or more radially outwardly projecting tabs 61 circumferentially positioned thereabout. Collar 58 is formed of suitable material such as injection molded plastic having a sufficient degree of resiliency to momentarily radially deflect as it is inserted within opening 60 of connector 44 and then snap back to its illustrated shape whereby tabs 61 are axially positioned between opening 60 and fingers 55. Conduit 43 is subsequently inserted within opening 60 to engage retaining member 54 as described hereinabove. The innermost end of collar 58 is tapered to define a ramp surface 62 disposed adjacent fingers 55 of retaining member 54. To demate conduit 43 from connector 44, tool 10 is positioned about conduit 43 as described hereinabove but with the finger members 20-23 extending away from connector 44. As tool 10 is advanced axially (leftwardly), abutment surfaces 37, 38 contact the right-hand most circumferential surface 63 of collar 58. Further leftward advancement of tool 10 momentarily axially displaces collar 58 leftwardly to radially outwardly depress fingers 55 until they are clear of peripheral abutment 52 whereinafter conduit 43 and tool 10 can be axially removed from connector 44.

Figure 9:
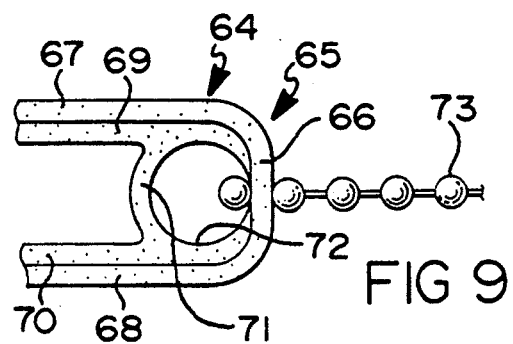
FIG. 9, is a fragmentary portion of the handle of an alternative embodiment of the invention.

Referring to FIG. 9, an alternative embodiment of an universal quick connector release tool 64 including a handle 65 with a base 66 and two generally parallel arms 67, 68 depending therefrom is illustrated. Likewise, arms 67, 68 include longitudinally extending reinforcing ribs 69, 70, respectively. A web 71 extends between ribs 69, 70 and coacts therewith to define a through passage 72 suitable for receiving a tether such as a beaded chain 73 for securing tool 64 to another object.

It is to be understood that the invention has been described with reference to a specific embodiment and variations to provide the features and advantages previously described and that such embodiments are susceptible of modification as ruled to be apparent to those skilled in the art. Accordingly, the forgoing is not to be construed in a limiting sense.

I claim:

1. A tool adapted for releasing male fittings from mating female connectors coupled together by a retaining element, said tool comprising:
   an elongated handle;
   a bifurcated body including first and second complementary body halves resiliently carried by said handle; and
   at least one finger member extending from each body half, said finger members radially converging along their axial length coacting to define a radially compliant passageway operable, in application, to substantially conform to a surface of said male fitting and to displace said retaining element to release said fitting from said connector;

2. A tool adapted for releasing male fittings from mating female connectors coupled together by a retaining element and falling within a predetermined dimensional range, said tool comprising:
   a generally u-shaped handle including a base portion and generally parallel resilient arm portions extending therefrom;
   a bifurcated body including first and second complementary body halves carried by corresponding free ends of said arm portions; and
   a plurality of finger members depending from each body half, said finger members coacting to define a radially compliant passageway and operable, in application, to substantially conform dimensionally to an outer surface of said male fitting and, upon subsequent axial displacement with respect thereto, to displace said retaining element effecting a release of said male fitting from said female connector.

3. The tool of claim 2, wherein said handle, body and finger members are integrally formed from a homogeneous material.

4. The tool of claim 3, wherein said material is plastic.

5. The tool of claim 3, wherein said material is metal.

6. The tool of claim 2, wherein two circumferentially spaced finger members depend from each body half.

7. The tool of claim 2, wherein said finger members are substantially equally circumferentially spaced about said passageway.

8. The tool of cl aim 2, wherein said arm portions define first and second coplanar abutment surfaces straddling said passageways.

9. The tool of claim 2, wherein said finger members have a generally arcuate cross section.

10. The tool of claim 9, wherein each finger member has a substantially constant radius along its entire length.

11. A tool adapted for releasing tubular male fittings from mating female connectors coupled together by a retaining mechanism said tubular fittings falling within a predetermined range of characteristic outer diameters, said tool comprising:
   a generally u-shaped elongated handle including a base portion and substantially parallel resilient arm portions extending therefrom; a bifurcated body including first and second complimentary body halves carried by corresponding free ends of said arm portions; and
   at least one finger member depending from each body half, said finger members each having a generally arcuate cross section and coacting to define a tapered elongated radially compliant passageway, said handle and passageway each having characteristic lines of elongation which are respectively angularly offset, said finger members operable, in application, to substantially conform dimensionally to the outer diameter surface of said tubular fitting and, upon subsequent axial displacement with respect thereto, to displace a retaining element within said retaining mechanism effecting a release of said tubular male fitting from said female connector.

12. The tool of claim 11, wherein said handle and passageway lines of elongation are offset at an acute angle.

13. The tool of claim 11, wherein said handle and passageway lines of elongation are offset at an obtuse angle.

14. The tool of claim, 11, wherein said handle and passageway lines of elongation are normally offset.

15. The tool of claim 11, wherein said range of characteristic outer diameter is ¼ inch (0.635 cm) to ⅜ inch (0.953 cm).

16. The tool of claim 11, wherein each finger member has a substantially constant radius along its entire length.

17. The tool of claim 16, wherein said finger member radius is one half of the value of a characteristic outer diameter near the middle of said predetermined range.

18. The tool of claim 11, further comprising a system of finger tabs integrally formed in said handle and body whereby an operator with two fingers, can simultaneously squeeze said body halves together and forcefully displace the tool axially along a tubular male fitting.

19. The tool of claim 11, wherein said handle base portion defines a tether receiving through passage.

20. The tool of claim 2, further comprising a tether receiving recess.

21. The tool of claim 9, wherein each finger member has a characteristic radius which varies therealong.

22. A tool adapted for releasing male fittings from mating female connectors coupled together by a retaining element and falling within a predetermined dimensional range, said tool comprising:
   a generally u-shaped handle including a base portion and generally parallel resilient arm portions extending therefrom;
   a bifurcated body including first and second complementary body halves carried by corresponding free ends of said arm portions; and at least one finger member depending from each body half, said finger members radially converging along their axial length coacting to define a radially compliant passageway and operable, in application, to substantially conform dimensionally to an outer surface of said male fitting and, upon subsequent axially displacement with respect thereto, to displace said retaining element effecting a release of said male fitting from said female connector.

* * * * *